United States Patent
Huang et al.

(10) Patent No.: US 7,580,615 B2
(45) Date of Patent: Aug. 25, 2009

(54) METHOD AND APPARATUS FOR DISPLAYING MULTIPLE SUBTITLES USING SUB-PICTURE PROCESSING

(75) Inventors: Hung-Jen Huang, Hsinchu (TW); Hsin-Ting Lin, Caotun Township, Nantou County (TW); Chao-Yung Liu, Taipei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 796 days.

(21) Appl. No.: 11/194,896

(22) Filed: Aug. 1, 2005

(65) Prior Publication Data

US 2006/0222336 A1    Oct. 5, 2006

(30) Foreign Application Priority Data

Mar. 31, 2005    (TW) .............................. 94110189 A

(51) Int. Cl.
 *H04N 5/76*    (2006.01)
(52) U.S. Cl. .......................................... 386/95; 386/126
(58) Field of Classification Search .................... 386/33, 386/31, 45, 95, 124–126
See application file for complete search history.

(56) References Cited

U.S. PATENT DOCUMENTS 6,526,214 B2 *    2/2003    Maertens ...................... 386/33

FOREIGN PATENT DOCUMENTS

| JP | 10-215409 | * | 8/1998 |
| KR | 3003-065655 | * | 8/2003 |

OTHER PUBLICATIONS

Byeon et al., machine generated translation of KR 2003-0065655, Aug. 2003.*
Maeda et al, machine generated translation of JP 10-215409, Aug. 1998.*
Machine generated treanlation of Japanese Patent Document #10-215409 to Maeda et al., dated Aug. 1998.*

* cited by examiner

*Primary Examiner*—David E Harvey
(74) *Attorney, Agent, or Firm*—J.C. Patents

(57) ABSTRACT

The mechanism of a sub-picture processing method for displaying multiple subtitles in a video/audio playing apparatus is provided. The purpose for displaying multiple subtitles in different languages simultaneously can be achieved under a user's control. Due to the unique control procedures and the concept of time division multiplexing, the present invention only employs a single sub-picture decoding unit and a single image mixer to display multiple subtitles in different languages at any preferred positions of the main picture.

16 Claims, 6 Drawing Sheets

METHOD AND APPARATUS FOR DISPLAYING MULTIPLE SUBTITLES USING SUB-PICTURE PROCESSING

CROSS-REFERENCE TO RELATED APPLICATION

This application claims the priority benefit of Taiwan application serial no. 94110189, filed on Mar. 31, 2005. All disclosure of the Taiwan application is incorporated herein by reference.

BACKGROUND OF THE INVENTION

1. Field of the Invention

The present invention relates to a method and an apparatus for displaying multiple subtitles by sub-picture processing, and particularly to a method and an apparatus for displaying multiple subtitles of a digital versatile disk (DVD) player.

2. Description of Related Art

Optical disks, having the advantages of huge storage capacity, easy preservation, long preservation period, low cost, and damage resistance for saved data, are gradually replacing the general conventional magnetic storage medium and become one of the indispensable optical storage medium. With huge storage capacity, the most commonly seen DVDs nowadays can be recorded with a large volume of subtitles in multiple languages and displayed with a number of subtitles in different languages simultaneously if under proper operation by users when being played.

The conventional method for displaying multiple language subtitles of a DVD is to employ a plurality of sub-picture decoding units to decode the multiple languages subtitles. Consequently, two the sub-picture decoding units are required for displaying two subtitles simultaneously, and three sub-picture decoding units are required for displaying three subtitles simultaneously, and so on. Therefore, the number of the sub-picture decoding units will need to be added if more sub-picture subtitles are to be displayed. As a result, not only will the production costs be increased, lots of extra amendments to the image mixers of the original sub-picture will also be made to meet the function requirements.

FIG. 1 is a flowchart illustrating the process of a conventional DVD player displaying multiple languages subtitles. First, in step 100, the hardware is required to provide an image recording area for a sub-picture. Then in step 102, a first sub-picture is checked to see if it is enabled. If not, the sub-picture processing stops. If yes, in step 104, the sub-picture control and sub-picture image data corresponding to the first sub-picture are requested from the storage media so as to decode the first sub-picture in the first sub-picture unit in step 106. The first sub-pictures is adjusted in step 108 and integrated into the sub-picture image recording area of the sub-picture in step 110 before moving to the processing of the second sub-picture. In step 112, a second sub-picture is checked to see if it is enabled. If it is not, the sub-picture processing stops. If it is yes, in step 114, the sub-picture control and sub-picture image data corresponding to the second sub-picture are requested from the storage media to decode the second sub-picture in the second sub-picture unit in step 116. The second sub-picture is adjusted in step 118 and integrated into the sub-picture image recording area of the sub-picture in step 120. Then, in step 122, the entire image of the sub-pictures is integrated into the image mixer of the main picture. If this method can only enable two sub-pictures, the sub-picture processing stops.

In view of the above, if more sub-pictures are to be enabled, not only will the number of the decoding units of the sub-pictures increase, the corresponding additional steps will also rise. Hence, a solution to the above is provided in the present invention.

SUMMARY OF THE INVENTION

An object of the present invention is to provide a sub-picture processing method using the controlling process of time division multiplexing for displaying subtitles in multiple languages.

Another object of the present invention is to provide a playing apparatus to display multiple subtitles with a single sub-picture decoding unit and a single image mixer instead of the conventional technique, in which multiple sub-picture decoding units and multiple image mixers are used.

The present invention provides a sub-picture processing method adapted for a video/audio playing apparatus to read a video/audio data, including the data of N sub-pictures, wherein the data of each sub-picture includes a sub-picture control command and a sub-picture image data. The sub-picture processing method comprises the following steps. First, when the $M^{th}$ sub-picture is enabled, the current displaying position in the vertical direction is checked to see if it reaches the predetermined displaying position in the vertical direction of the $M^{th}$ sub-picture. Secondly, if the result is positive, the sub-picture control command and the sub-picture image data corresponding to the $M^{th}$ sub-picture is requested to decode the sub-picture image data so that a sub-picture image signal is obtained and output. Lastly, the foregoing steps are repeated until the current displaying position reaches the bottom of the image, wherein M and N are natural numbers and $M \leq N$.

The present invention provides another sub-picture processing method adapted for a video/audio playing apparatus to read a video/audio data, including the data of N sub-picture, wherein the data of each sub-picture includes a sub-picture control command and a sub-picture image data. The sub-picture processing method comprises the following steps. First, when the $M^{th}$ sub-picture is enabled, the sub-picture control command and the sub-picture image data corresponding to the $M^{th}$ sub-picture is requested to decode and pre-store the sub-picture image data. Secondly, when the current displaying position in the vertical direction reaches the predetermined displaying position in the vertical direction of the $M^{th}$ sub-picture, then a pre-stored and decoded sub-picture image data is output via a sub-picture image signal. Lastly, the foregoing steps are repeated until the current displaying position reaches the bottom of the image, wherein M and N are natural numbers and $M \leq N$.

According to an embodiment of the present invention, in the two above-described sub-picture processing methods, the sub-picture control command of the $M^{th}$ sub-picture comprises an original vertical displaying information to provide the original displaying position in the vertical direction for the $M^{th}$ sub-picture and a virtual vertical displaying information to provide the predetermined displaying position in the vertical direction for the $M^{th}$ sub-picture.

According to another embodiment of the present invention, in the two above-described sub-picture processing methods, the sub-picture control command of the $M^{th}$ sub-picture comprises a new vertical displaying position information, obtained by directly modifying the corresponding original vertical displaying position, to provide the predetermined displaying position in the vertical direction for the $M^{th}$ sub-picture.

The present invention also provides a playing apparatus for displaying multiple subtitles, comprising a demultiplexer, a main picture decoding unit, a sub-picture host unit, a sub-picture decoding unit and an image mixer. The demultiplexer can divide a video/audio data into a main picture image data and N sub-picture control image data. The main picture decoding unit can decode the main picture image data and obtain a main picture image signal. The sub-picture host unit is able to divide each of the sub-picture control image data into a sub-picture control command and a sub-picture image data. The sub-picture decoding unit is able to produce a sub-picture control signal according to the sub-picture control command of the $M^{th}$ sub-picture and further decode the sub-picture image data of the $M^{th}$ sub-pictures by handling the sub-picture control signal in the manner of time division multiplexing to obtain a sub-picture image signal. The image mixer is able to compose a digital image output signal from the subtitle data contained in the sub-picture image signal and the main picture image signal, wherein M and N are natural numbers and $M \leq N$.

According to an embodiment of the present invention, the sub-picture decoding unit comprises a command buffer, a control unit, a data buffer and a scattering unit. The command buffer is for receiving the sub-picture control command and producing a plurality of control commands after the buffer process. The control unit is to produce a corresponding sub-picture control signal and a scattering control signal according to the received control commands. The data buffer is to receive the sub-picture control signal and control the buffered sub-picture image data so as to further produce a sub-picture color signal. The scattering unit is to receive a scattering control signal and a sub-picture color signal and to use the scattering control signal to control the sub-picture color signal so as to produce a sub-picture image signal.

According to an embodiment of the present invention, the manner of time division multiplexing is carried out based on the following steps. First, when the $M^{th}$ sub-picture is enabled, the current displaying position in the vertical direction is checked to see if it reaches the predetermined displaying position in the vertical direction of the $M^{th}$ sub-picture. Secondly, the sub-picture control command corresponding to the $M^{th}$ sub-picture is requested to be input into a command buffer and the control unit also requires the sub-picture image data corresponding to the $M^{th}$ sub-picture to be input into the data buffer and decode the sub-picture image data, whereby a sub-picture image signal is obtained and output. Lastly, the foregoing steps are repeated until the current displaying position reaches the bottom of the image.

According to an embodiment of the present invention, the sub-picture decoding unit also comprises a random access memory (RAM), wherein the manner of time division multiplexing is according to the following steps. First, when the $M^{th}$ sub-picture is enabled, the sub-picture control command corresponding to the $M^{th}$ sub-picture is requested to be input into a command buffer and the sub-picture image data corresponding to the $M^{th}$ sub-picture is also requested to be input into a data buffer by the control unit. Secondly, the current displaying position in the vertical direction is checked to see if it reaches the predetermined displaying position in the vertical direction of the $M^{th}$ sub-picture. If the result is positive, a decoded sub-picture image data pre-stored in the random access memory is output via a sub-picture image signal. Lastly, the foregoing steps are repeated until the current displaying position reaches the bottom of the image.

According to an embodiment of the present invention, the sub-picture control command for the $M^{th}$ sub-picture of the playing apparatus which displays multiple subtitles comprises an original vertical displaying position information to provide the original displaying position in the vertical direction for the $M^{th}$ sub-picture and a virtual vertical displaying information to provide the data of the $M^{th}$ sub-picture, predetermined to display in the vertical direction.

According to another embodiment of the present invention, the sub-picture control command of the $M^{th}$ sub-picture of the playing apparatus which displays multiple subtitles comprises a new vertical displaying position information, obtained by directly modifying the corresponding original vertical displaying position, to provide the predetermined displaying position in the vertical direction of the $M^{th}$ sub-picture.

Due to the unique control process and the idea of time division multiplexing, the present invention uses only a single sub-picture decoding unit and a single image mixer to display multiple subtitles in different languages in any positions of the main picture.

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
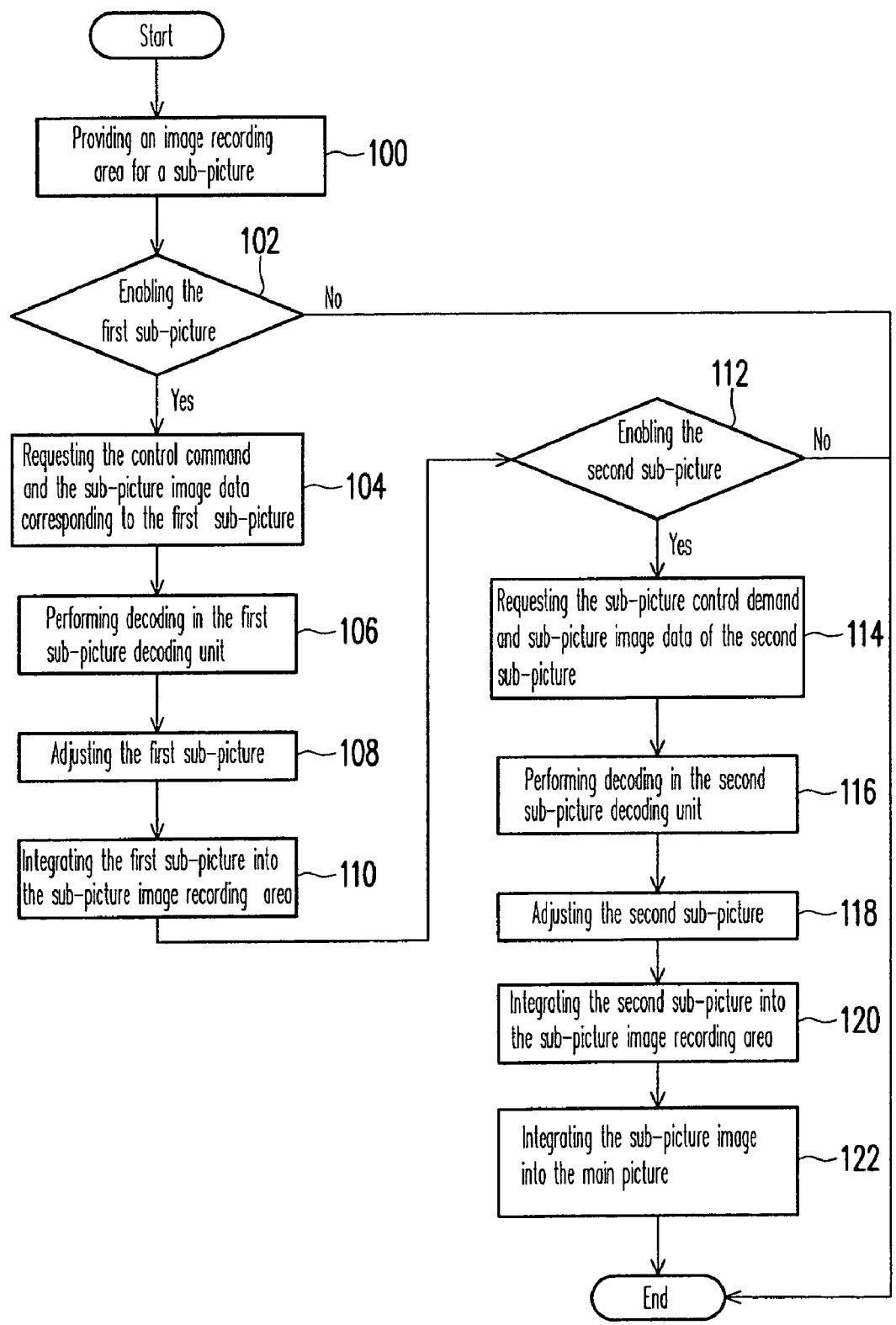
FIG. 1 is a schematic flowchart diagram illustrating the process of a conventional DVD player displaying multiple subtitles in different languages.

Now, referring to the figures, the feathers of the present invention will be described in detail in connection with the embodiments. The spirit and the scope of the present invention should not be limited by the selected embodiments for illustration purpose. It is to be noted that the sizes and proportions shown in the drawings should not be considered as restriction. Any of the structures and the materials to be described below can be modified within the scope of the present invention.

Figure 2:
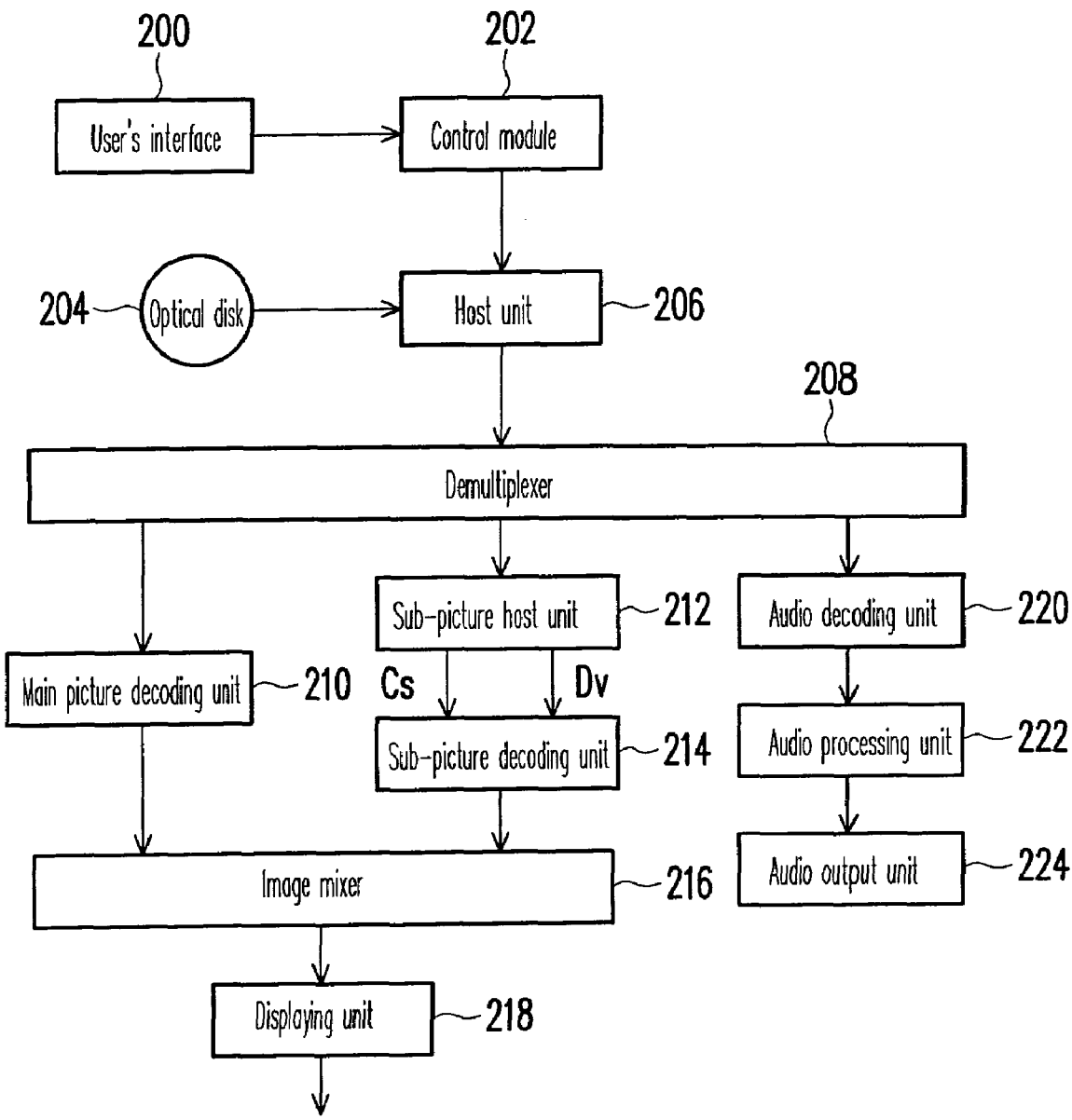
FIG. 2 is a block diagram schematically illustrating a video/audio playing apparatus.

FIG. 2 is a block diagram schematically illustrating a video/audio playing apparatus. What is shown in FIG. 2 is a sub-picture processing mechanism for a typical embodiment of the present invented DVD optical disk.

Referring to FIG. 2, the blocks include a user's interface 200, a control module 202, a DVD optical disk 204, a host unit 206, a demultiplexer 208, a main picture decoding unit 210, a sub-picture host unit 212, a sub-picture decoding unit 214, an image mixer 216, a displaying unit 218, an audio decoding unit 220, an audio processing unit 222, and an audio output unit 224.

The user's interface 200 uses an action command to make the control module 202 to output a playing control signal. The host unit 206 then reads a video/audio data from the DVD optical disk 204 according to the playing control signal and transfers the video/audio data to the demultiplexer 208 for processing. The demultiplexer 208 divides the video/audio data into a main picture image data, a sub-picture control image data, and an audio data for further video/audio processing.

A main picture image signal is obtained after the main picture image data is decoded by the main picture decoding unit 210.

The sub-picture control image data are divided by the sub-picture host unit 212 into a sub-picture control command Cs and a sub-picture image data Dv. A sub-picture control signal is produced by inputting the sub-picture control command Cs into the sub-picture decoding unit 214 so as to decode the sub-picture image data Dv with only one sub-picture decoding unit 214 and produce a sub-picture image signal in a manner of time division multiplexing, by which the disadvantage of the conventional techniques requiring multiple the sub-picture decoding units for processing is improved, as only a single sub-picture decoding unit 214 is needed in this embodiment.

The sub-picture image signal, which contains multiple subtitles, is decoded by the sub-picture decoding unit 214 and transmitted to the image mixer 216. A digital image output signal is formed after the sub-picture image signal is mixed with the main picture image signal decoded by the main picture decoding unit 210. The digital image output signal is transferred into a digital analogical image output signal via a displaying unit 218 for a monitor to display.

The audio data is transferred into an audible audio analogical signal via the audio decoding unit 220, the audio processing unit 222, and the audio output unit 224.

Figure 3A:
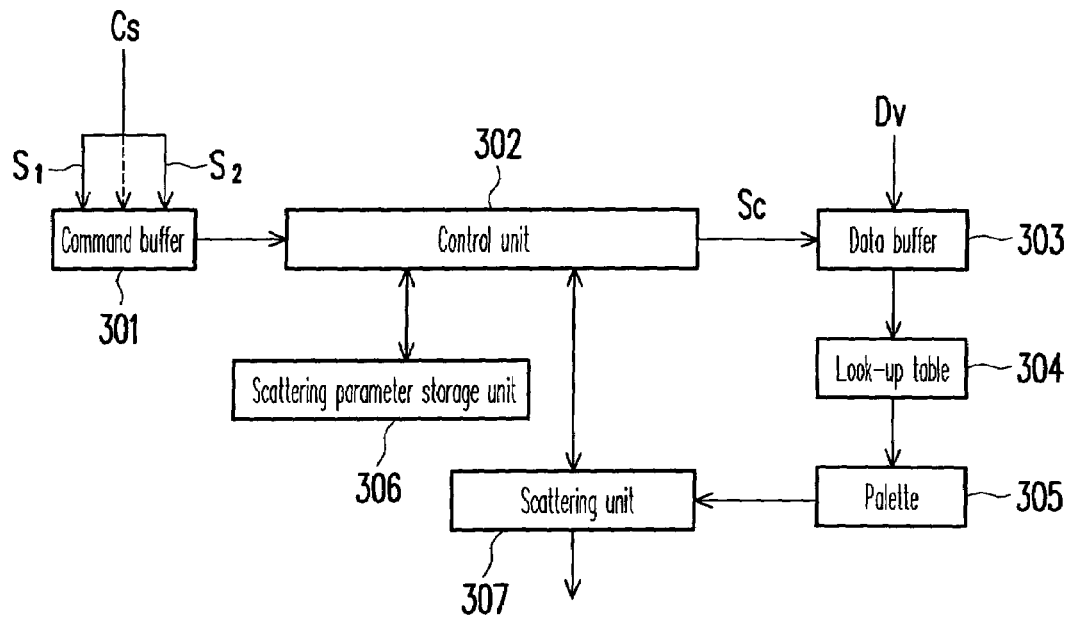
FIG. 3A is a schematic diagram illustrating a sub-picture decoding unit in an embodiment shown in FIG. 2.

Referring to FIG. 3A, the sub-picture host unit 212 of FIG. 2 filters the control and image data from each of the sub-picture control image data and incorporates with the sub-picture control command Cs and a sub-picture image data Dv provided by each of the sub-pictures, wherein the sub-picture control command Cs in an embodiment of the present invention also comprises an original vertical displaying position information S1 and a virtual vertical displaying position information S2.

Referring to FIG. 3A, the sub-picture decoding unit 214 of FIG. 2 includes a command buffer 301, a control unit 302, a data buffer 303, a look-up table 304, a palette 305, a scattering parameter storage unit 306, and a scattering unit 307.

The command buffer 301 of the sub-picture host unit receives the original vertical displaying position information S1 and the virtual vertical displaying position information S2. Then, the control unit 302 reads S1 and S2 and considers the virtual vertical displaying position information S2 as an actual displaying position information in the vertical direction. The control unit 302 is adapted for processing the sub-picture control command Cs, by which a sub-picture control signal can be produced and the data flowing within the sub-picture decoding unit 214 can be controlled thereafter.

The data buffer 303 is adapted for storing the pre-decompressed sub-picture image data Dv. The data buffer 303, controlled by a sub-picture control signal Sc, looks up the undecompressed sub-picture image data Dv via the look-up table 304 and therefore obtains the decompressed sub-picture image data format. The produced color index can refer to the color data stored in the palette 305 to obtain the colors to be output from the sub-pictures.

The scattering parameter storage unit 306 is adapted for storing various adjusting parameters to adjust the scales and brightness of each of the sub-pictures. The scattering unit 307 receives the color data of the palette 305 and the control signal of the control unit 302 for the data flowing to further adjust the scale of each sub-picture and generate the sub-picture image signal.

Figure 3B:
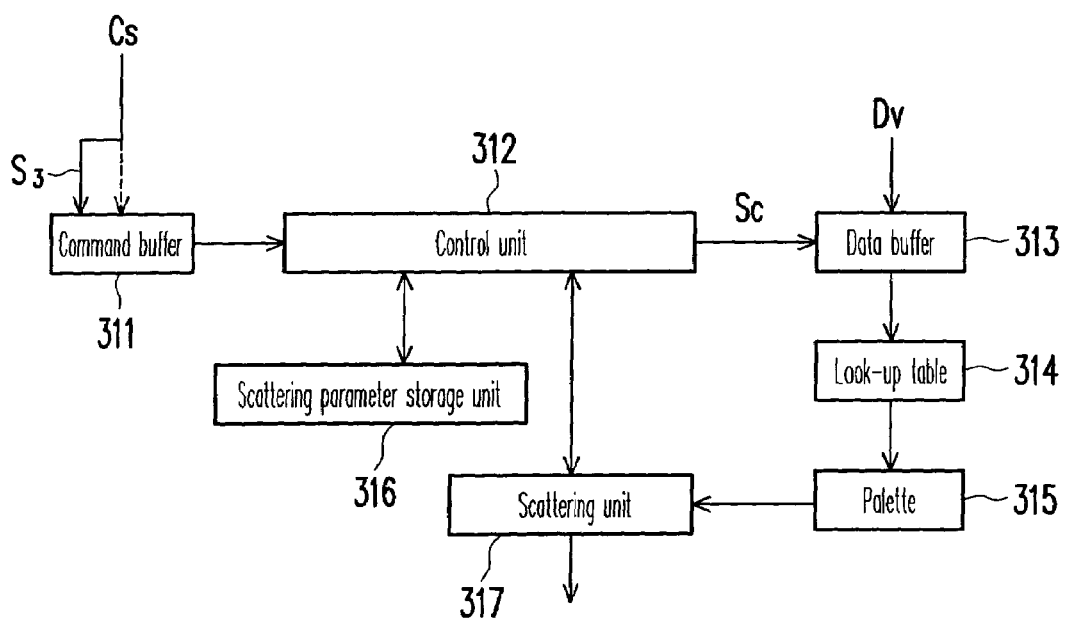
FIG. 3B is a schematic diagram illustrating a sub-picture decoding unit in another embodiment shown in FIG. 2.

Referring to FIG. 3B, in another embodiment of the present invention, the sub-picture control command Cs also comprises a new displaying position information S3 in the vertical direction, obtained by directly modifying the original displaying position information S1 in the vertical direction for providing the actual displaying position in the vertical direction of the sub-picture.

Referring to FIG. 3B, the sub-picture decoding unit 214 of FIG. 2 includes a command buffer 311, a control unit 312, a data buffer 313, a look-up table 314, a palette 315, a scattering parameter storage unit 316, and a scattering unit 317.

The command buffer 311 of the sub-picture host unit receives the new vertical displaying position information S3, which is to be read out by the control unit 312 and wherein the new vertical displaying position information S3 is considered as an actual vertical displaying position information. The control unit 312 is adapted for processing the sub-picture control command Cs, by which a sub-picture control signal Sc can be produced and the data flowing within the sub-picture decoding unit 214 can be controlled thereafter.

The data buffer 313 is adapted for storing the sub-picture image data Dv before being decompressed. The data buffer 313, controlled by a sub-picture control signal Sc, looks up the undecompressed sub-picture image data Dv in the look-up table 314 and therefore obtains the decompressed sub-picture image data format. The produced color index can refer to the color data stored in the palette 315 to obtain the colors to be output from the sub-picture.

The scattering parameter storage unit 316 is adapted for storing various adjusting parameters to adjust the scale and brightness of each of the sub-pictures. The scattering unit 317 receives the color data from the palette 315 and the control signal of the control unit 312 for the data flowing to further adjust the scale of each of the sub-pictures and generate the sub-picture image signal.

Figure 3C:
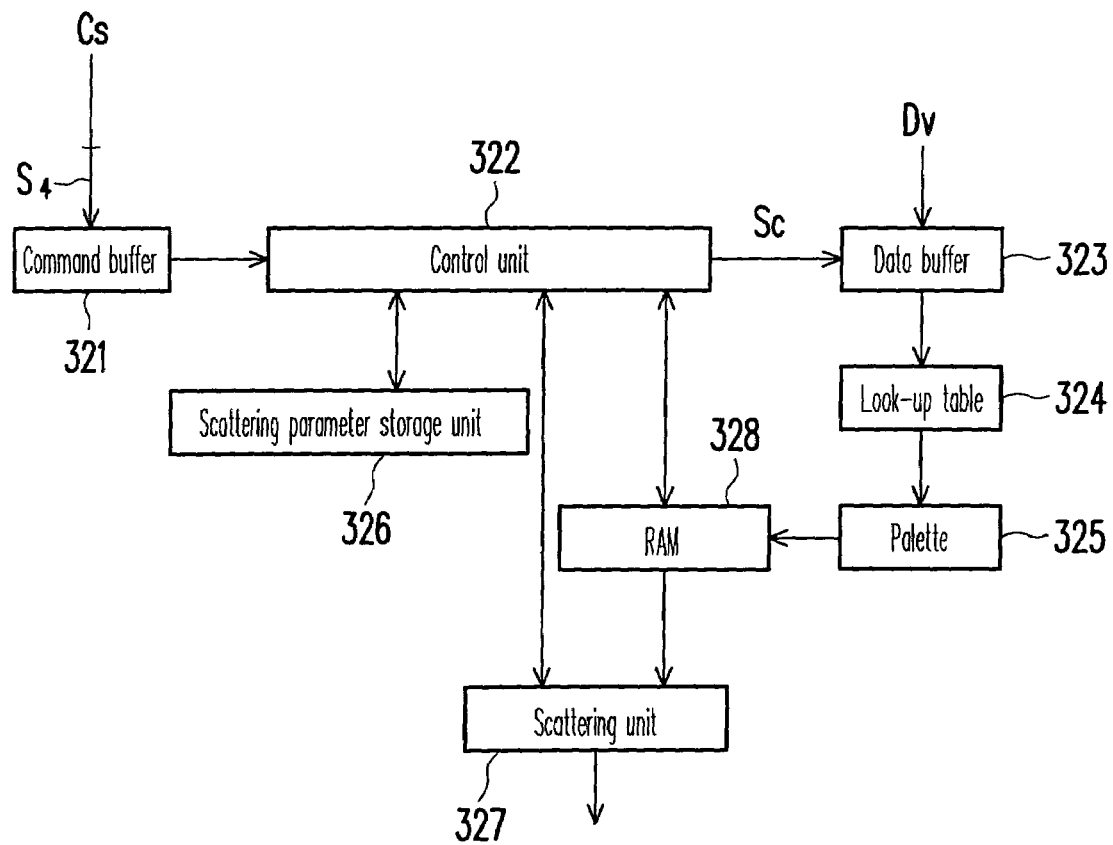
FIG. 3C is a schematic diagram illustrating a sub-picture decoding unit in yet another embodiment shown in FIG. 2.

Referring to FIG. 3C, in another embodiment of the present invention, the sub-picture control command Cs also comprises a displaying position information S4 of the sub-picture, which can be replaced by an extra virtual vertical displaying position information S2 or a new vertical displaying position information S3 to provide the actual displaying position in the vertical direction of the sub-picture.

Referring to FIG. 3C, the sub-picture decoding unit 214 of FIG. 2 includes a command buffer 321, a control unit 322, a data buffer 323, a look-up table 324, a palette 325, a scattering parameter storage unit 326, a scattering unit 327, and a RAM 328.

The command buffer 321 of the sub-picture host unit receives the vertical displaying position information S4, which is to be read out by the control unit 322 and considers the vertical displaying position information S4 as an actual displaying position information in the vertical direction. The control unit 322 is adapted for processing the sub-picture control command Cs, by which a sub-picture control signal Sc can be produced and the data flowing within the sub-picture decoding unit 214 can be controlled thereafter.

The data buffer 323 is adapted for storing the undecompressed sub-picture image data Dv. The data buffer 323, controlled by a sub-picture control signal Sc, looks up the undecompressed sub-picture image data Dv via the look-up table 324 and therefore obtains the decompressed sub-picture image data format. The produced color index can refer to the color data stored in the palette 325 to obtain the colors to be output from the sub-picture. The sub-picture to be displayed by the colors of the sub-picture will be stored in the RAM 328 and its access function will be controlled by the control unit 322.

The scattering parameter storage unit 326 is adapted for storing various adjusting parameters to adjust the scale and brightness of each of the sub-pictures. The scattering unit 327 receives the control signals from the control unit 322 for the data flowing and obtains the decoded sub-picture data from the RAM 328 to adjust the scale of each of the sub-pictures and generate the sub-picture image signal. In the embodiment, the sub-picture is pre-decoded and then written back to the RAM 328. Accompanying with the methods of the two foregoing embodiments, the control unit 321 reads out the sub-picture image signal and directly inputs the signal into the image mixer according to the virtual vertical displaying position information S2 or the new vertical displaying position information S3.

The foregoing embodiments perform the image signal processing method for a plurality of the sub-pictures with a single sub-picture decoding unit and a single image mixer in a manner of time division multiplexing, in which the steps and process are to be described in detail below.

Figure 4A:
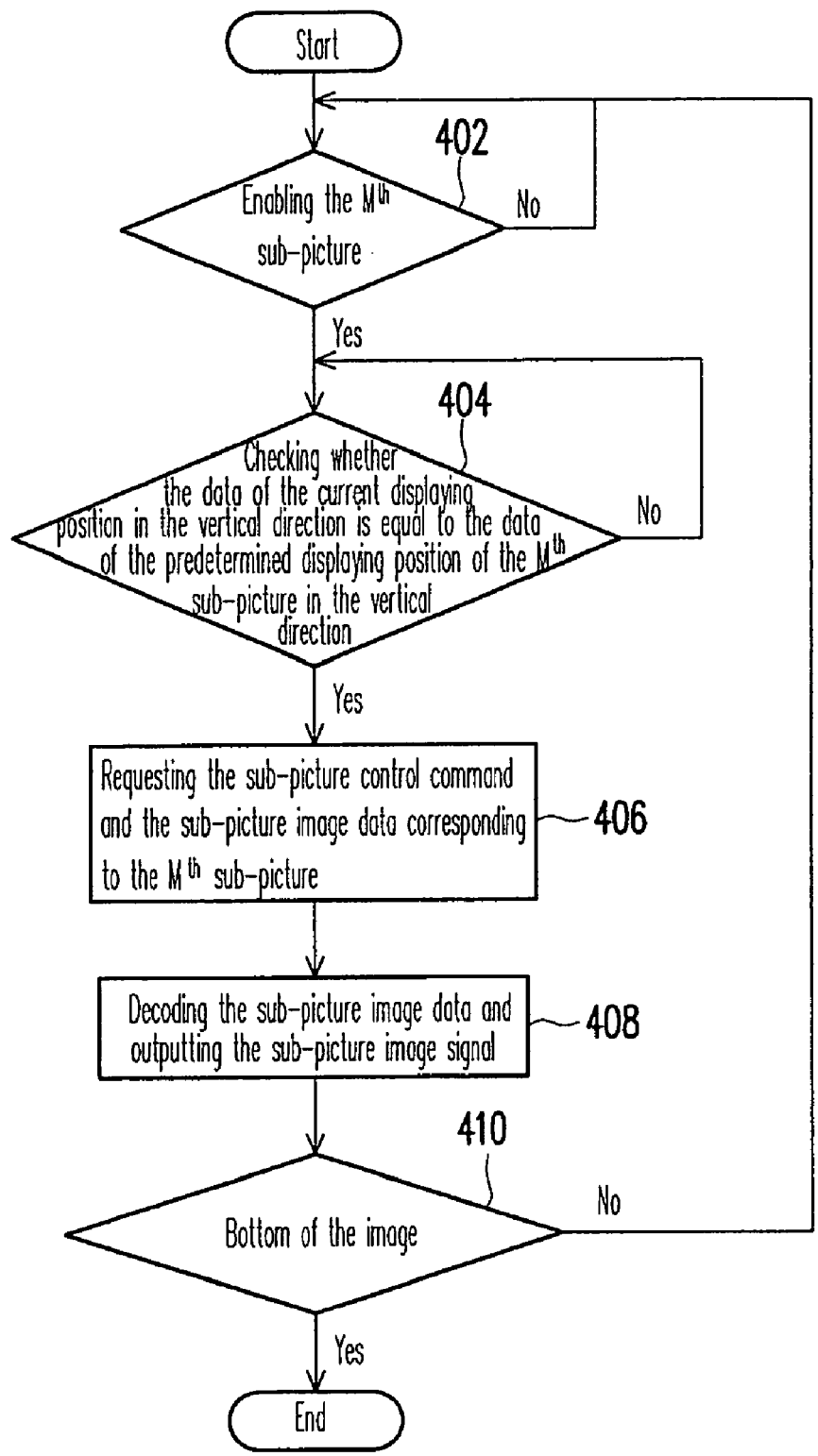
FIG. 4A is a flowchart illustrating a sub-picture processing method.

FIG. 4A is a diagram illustrating a sub-picture processing method, adapted for a video/audio playing apparatus. The video/audio playing apparatus can access a video/audio data comprising the data of N the sub-pictures. The data of each sub-picture comprises a sub-picture control image data. In addition, each sub-picture control image data comprises a sub-picture control command Cs and a sub-picture image data Dv. The sub-picture processing method shown in the flowchart comprises the steps below.

First, the $M^{th}$ sub-pictures is checked to see if it is enabled in step 402. If not, go back to the previous step to check if another sub-picture is enabled. If yes, go to the next step 404 to check whether the current displaying position in the vertical direction reaches the predetermined displaying position in the vertical direction of the $M^{th}$ sub-picture S4, wherein the predetermined displaying position of the $M^{th}$ sub-picture in the vertical direction S4 can be the aforementioned virtual vertical displaying position information S2 or the new vertical displaying position information S3. If not, go back to the previous step to check whether the current displaying position in the vertical direction reaches the predetermined displaying position in the vertical direction of the $M^{th}$ sub-picture. If a positive result is obtained, then in step 406, the sub-picture control command Cs and the sub-picture image data Dv corresponding to the $M^{th}$ sub-picture are requested. Then in step 408, the sub-picture image signal, decoded from the sub-picture image data Dv, is output. The foregoing steps are repeated to check whether the current displaying position reaches the bottom of the image 410. If it does, the sub-picture processing ends; if not, then go back to step 402 to check whether the next sub-picture can be enabled.

The above-mentioned M and N are natural numbers and $M \leq N$.

When combined with a sub-picture decoding unit, the sub-picture processing method is described as follows. First, when the $M^{th}$ sub-picture are enabled, the current displaying position in the vertical direction is checked to see if it reaches the predetermined displaying position in the vertical direction of the $M^{th}$ sub-picture. After that, the sub-picture control command Cs corresponding to the $M^{th}$ sub-picture is requested to be input into the command buffer and the sub-picture image data Dv corresponding to the $M^{th}$ sub-picture is requested to be input into the data buffer and be decoded to obtain and output the sub-picture image signal. The foregoing steps are repeated until the current displaying position reaches the bottom of the image.

Figure 4B:
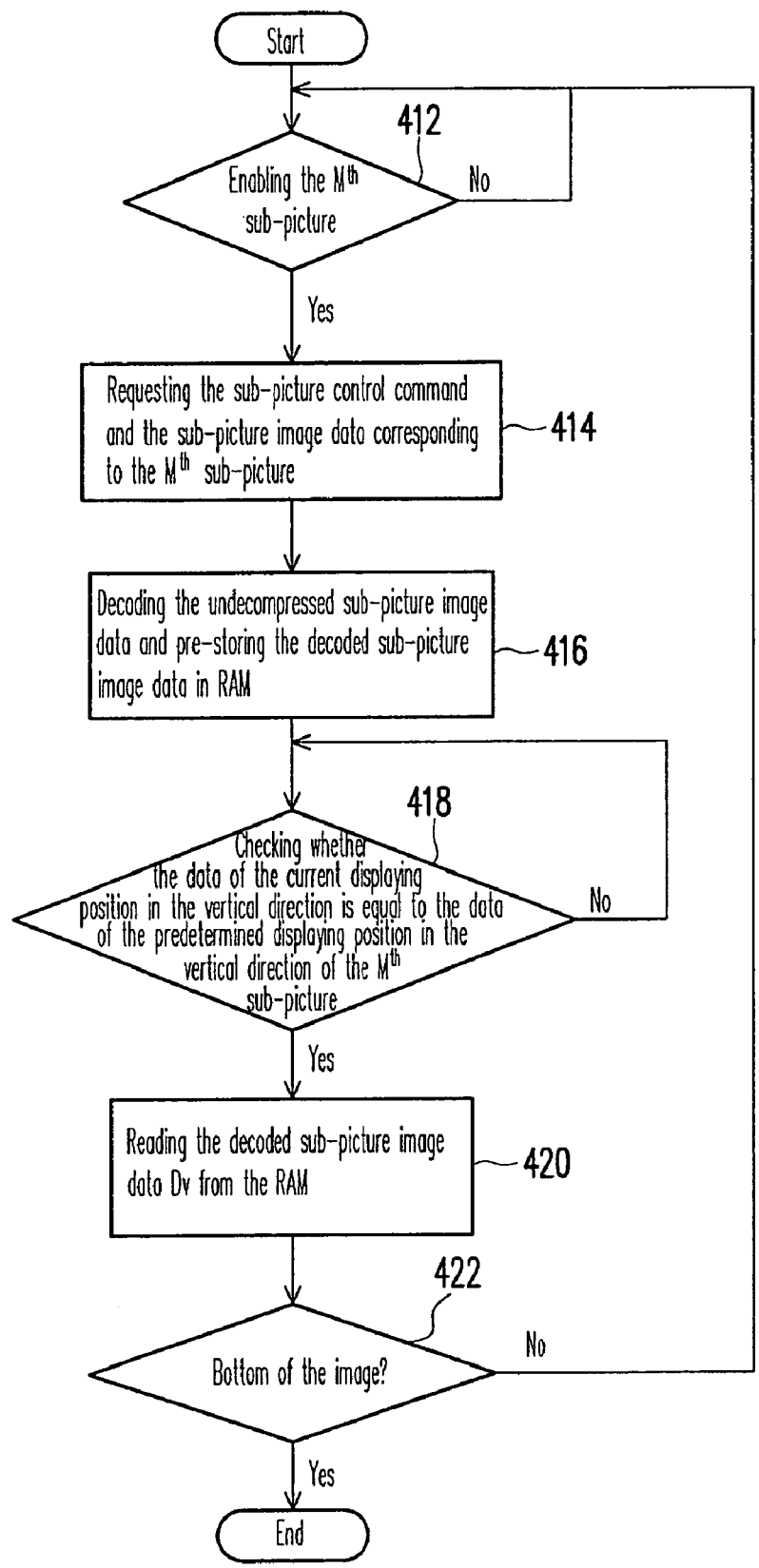
FIG. 4B is a flowchart illustrating another sub-picture processing method.

FIG. 4B is a diagram illustrating another sub-picture processing method that is also adapted for a video/audio playing apparatus. The major difference between FIG. 4A and FIG. 4B is that the latter employed a pre-storage method to store the decoded data into a RAM for later accesses. The video/audio data read by the video/audio playing apparatus comprises the data of N sub-picture, wherein the data of each the sub-pictures comprises a sub-picture control image data. In addition, the data of each sub-picture control image data comprises a sub-picture control command Cs and a sub-picture image data Dv. The sub-picture processing method shown in the flowchart comprises the steps as below.

First, the $M^{th}$ sub-picture is checked whether it is enabled in step 412. If not, go back to the previous step to check if another sub-picture is enabled. If yes, go to the next step 414, wherein the sub-picture control command Cs and the sub-picture image data Dv corresponding to the $M^{th}$ sub-picture are requested. Next, the sub-picture image data is decoded and the decoded data of the sub-picture is pre-stored into the RAM in step 416 and check whether or not the current displaying position in the vertical direction reaches the predetermined displaying position in the vertical direction of the $M^{th}$ sub-picture S4, which can be the afore-mentioned virtual vertical displaying position information S2 or new vertical displaying position information S3. If not, then go back to the previous step to check whether or not the current displaying position in the vertical direction reaches the predetermined displaying position in the vertical direction of another sub-picture. If a positive result is obtained, a decoded sub-picture image data Dv in the RAM is read to output the sub-picture image signal. The foregoing steps are repeated to check whether the current displaying position reaches the bottom of the image 422. If it does, then the sub-picture processing ends. If not, then go back to the step 412 to determine whether to enable the next sub-picture.

The above-mentioned M and N are natural numbers and $M \leq N$.

When combined with a sub-picture decoding unit, the sub-picture processing method is described as below. First, when the $M^{th}$ sub-pictures is enabled, the sub-picture control command Cs corresponding to the $M^{th}$ sub-picture is requested to be input into a command buffer and the sub-picture image data Dv corresponding to the $M^{th}$ sub-picture is requested to be input into a data buffer. Later, it is to be checked whether or not the current displaying position in the vertical direction reaches the predetermined displaying position in the vertical direction of the $M^{th}$ sub-picture. If a positive result is obtained, and then output the decoded sub-picture image data Dv pre-stored in the RAM via a sub-picture image signal. The foregoing steps are repeated until the current displaying position reaches the bottom of the image.

In view of the above-mentioned embodiments, if the quantity of the supporting sub-pictures is increasing, there is no need to modify the image mixers or increase the number of the decoding units.

Other modifications and adaptations of the above-described preferred embodiments of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

What is claimed is:

1. A sub-picture processing method, suitable for a video/audio playing apparatus for reading a video/audio data, wherein the video/audio data comprises a data of N sub-picture, wherein the data of each sub-picture comprises a sub-picture control image data, said sub-picture control image data comprises a sub-picture control command and a sub-picture image data, the video/audio playing apparatus comprises a sub-picture decoding unit, and the sub-picture processing method comprising:

when the $M^{th}$ sub-picture is enabled, requesting, at the sub-picture decoding unit, the sub-picture control command and the sub-picture image data corresponding to the $M^{th}$ sub-picture when the current displaying position in the vertical direction is on the predetermined displaying position of the $M^{th}$ sub-pictures in the vertical direction; and decoding the sub-picture image data and then outputting a sub-picture image signal after the sub-picture image signal is obtained; and repeating the foregoing steps until the current displaying position reaches the bottom of the image, wherein M and N are natural numbers and M≦N.

2. The sub-picture processing method according to claim 1, wherein the sub-picture control command of the $M^{th}$ sub-picture comprises:

an original displaying information in the vertical direction for providing the displaying position originally to be displayed in the vertical direction of the $M^{th}$ sub-picture; and a virtual vertical displaying position information for providing the predetermined vertical displaying position information of the $M^{th}$ sub-picture.

3. The sub-picture processing method according to claim 1, wherein the sub-picture control command of the $M^{th}$ sub-picture comprises a new vertical displaying position information, obtained by directly modifying the corresponding original vertical displaying position information for providing the predetermined vertical displaying position information of the $M^{th}$ sub-picture.

4. The sub-picture processing method according to claim 1, wherein the sub-picture decoding unit comprises a command buffer, a control unit, a data buffer, and a scattering unit, and sub-picture processing method further comprising:

receiving, at the command buffer, the sub-picture control command and producing a plurality of control commands after the buffering process;

producing, at the control unit, the sub-picture control signal of the $M^{th}$ sub-picture and a scattering control signal based on the received control commands;

receiving, at the data buffer, the sub-picture control signal to control the buffering processed sub-picture image data and further produce a sub-picture color signal; and receiving, at the scattering unit, a scattering control signal and a sub-picture color signal, wherein the scattering control signal controls the sub-picture color signal to further produce the sub-picture image signal.

5. A sub-picture processing method, suitable for a video/audio playing apparatus for reading a video/audio data, wherein the video/audio data comprises a data of N sub-picture, wherein the data of each sub-picture comprises a sub-picture control image data, said sub-picture control image data comprises a sub-picture control command and a sub-picture image data, the video/audio playing apparatus comprises a sub-picture decoding unit, and the sub-picture processing method comprising:

requesting, at the sub-picture decoding unit, the sub-picture control command and the sub-picture image data corresponding to the $M^{th}$ sub-picture when the $M^{th}$ sub-picture is enabled;

decoding and pre-storing the sub-picture image data;

outputting the pre-stored and decoded sub-picture image data via a sub-picture image signal when the current displaying position in the vertical direction is on the predetermined displaying position of the $M^{th}$ sub-picture in the vertical direction; and repeating the foregoing steps until the current displaying position reaches the bottom of the image, wherein M and N are natural numbers and M≦N.

6. The sub-picture processing method according to claim 5, wherein the sub-picture control command of the $M^{th}$ sub-picture comprises:

an original displaying information in the vertical direction for providing the displaying position originally to be displayed in the vertical direction of the $M^{th}$ sub-picture; and a virtual vertical displaying position information for providing the predetermined vertical displaying position information of the $M^{th}$ sub-picture.

7. The sub-picture processing method according to claim 5, wherein the sub-picture control command of the $M^{th}$ sub-picture comprises a new vertical displaying position information, obtained by directly modifying the corresponding original vertical displaying position information for providing the predetermined vertical displaying position information of the $M^{th}$ sub-picture.

8. The sub-picture processing method according to claim 5, wherein the sub-picture decoding unit comprises a command buffer, a control unit, a data buffer, and a scattering unit, and sub-picture processing method further comprising:

receiving, at the command buffer, the sub-picture control command and producing a plurality of control commands after the buffering process;

producing, at the control unit, the sub-picture control signal of the $M^{th}$ sub-picture and a scattering control signal based on the received control commands;

receiving, at the data buffer, the sub-picture control signal to control the buffering processed sub-picture image data and further produce a sub-picture color signal; and receiving, at the scattering unit, a scattering control signal and a sub-picture color signal, wherein the scattering control signal controls the sub-picture color signal to further produce the sub-picture image signal.

9. A playing apparatus for displaying multiple subtitles, comprising:

a demultiplexer, for dividing a video/audio data into a main picture image data and N sets of sub-picture control image data;

a main picture decoding unit, for decoding the main picture image data to obtain a main picture image signal;

a sub-picture host unit, for dividing said sub-picture control image data into a sub-picture control command and a sub-picture image data;

a sub-picture decoding unit, for producing a sub-picture control signal based on the sub-picture control command of the $M^{th}$ sub-picture to decode the sub-picture image data of the $M^{th}$ sub-picture and produce a sub-picture image signal in a manner of time division multiplexing, wherein the sub-picture decoding unit comprises:

a command buffer, for receiving the sub-picture control command and producing a plurality of control commands after the buffering process;

a control unit, for producing a corresponding sub-picture control signal and a scattering control signal based on the received control commands;

a data buffer, for receiving the sub-picture control signal to control the buffering processed sub-picture image data and further produce a sub-picture color signal; and a scattering unit, for receiving a scattering control signal and a sub-picture color signal, wherein the scattering control signal controls the sub-picture color signal to further produce a sub-picture image signal; and an image mixer, for integrating the subtitle data comprised in the sub-picture image signal and the main picture image signal into a digital image output signal, wherein M and N are natural numbers and M≦N.

10. The playing apparatus for displaying multiple subtitles according to claim 9, wherein the manner of time division multiplexing comprises:

when the $M^{th}$ sub-picture is enabled:

requesting the sub-picture control command corresponding to the $M^{th}$ sub-picture to be input into the command buffer when the current displaying position in the vertical direction is on the predetermined displaying position of the $M^{th}$ sub-picture in the vertical direction;

requesting the sub-picture image data corresponding to the $M^{th}$ sub-picture to be input into the data buffer by the control unit;

decoding the sub-picture image data, whereby a sub-picture image signal is obtained and output; and repeating the foregoing steps until the current displaying position reaches the bottom of the image.

11. The playing apparatus for displaying multiple subtitles according to claim 10, wherein the sub-picture control command of the $M^{th}$ sub-picture comprises:

an original displaying information in the vertical direction for providing the displaying position originally to be displayed in the vertical direction of the $M^{th}$ sub-picture; and a virtual vertical displaying position information for providing the predetermined vertical displaying position information of the $M^{th}$ sub-picture.

12. The playing apparatus for displaying multiple subtitles according to claim 10, wherein the sub-picture controlling command of the $M^{th}$ sub-picture comprises a new vertical displaying position information, obtained by directly modifying the corresponding original vertical displaying position information for providing the predetermined vertical displaying position information of the $M^{th}$ sub-picture.

13. The playing apparatus for displaying multiple subtitles according to claim 9, wherein the sub-picture decoding unit further comprises a RAM.

14. The playing apparatus for displaying multiple subtitles according to claim 13, wherein the manner of time division multiplexing comprises:

requesting the sub-picture control command corresponding to the $M^{th}$ sub-picture to be input into a command buffer when the $M^{th}$ sub-picture is enabled;

requesting the sub-picture image data corresponding to the $M^{th}$ sub-picture to be input into a data buffer by the control unit;

outputting a decoded sub-picture image data pre-stored in the RAM via a sub-picture image signal when the current displaying position in the vertical direction is on the predetermined displaying position of the $M^{th}$ sub-picture in the vertical direction; and repeating the foregoing steps until the current displaying position reaches the bottom of the image.

15. The playing apparatus for displaying multiple subtitles according to claim 14, wherein the sub-picture control command of the $M^{th}$ sub-picture comprises:

an original displaying information in the vertical direction for providing the displaying position originally to be displayed in the vertical direction of the $M^{th}$ sub-picture; and a virtual vertical displaying position information for providing the predetermined vertical displaying position information of the $M^{th}$ sub-picture.

16. The playing apparatus for displaying multiple subtitles according to claim 14, wherein the sub-picture control command of the $M^{th}$ sub-picture comprises a new vertical displaying position information, obtained by directly modifying the corresponding original vertical displaying position information for providing the predetermined vertical displaying position information of the $M^{th}$ sub-picture.

* * * * *